US008200227B2

(12) United States Patent
Liu et al.

(10) Patent No.: US 8,200,227 B2
(45) Date of Patent: Jun. 12, 2012

(54) SYSTEM AND METHOD FOR RESUMABLE DATA TRANSMISSION

(75) Inventors: Chih-Yuan Liu, Hsinchu (TW); Lun-Chia Kuo, Hsinchu (TW); Hui-Chun Lin, Hsinchu (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 763 days.

(21) Appl. No.: 12/000,532

(22) Filed: Dec. 13, 2007

(65) Prior Publication Data

US 2009/0156216 A1 Jun. 18, 2009

(51) Int. Cl.
*H04Q 7/20* (2006.01)

(52) U.S. Cl. .......................... 455/438; 725/87; 370/230

(58) Field of Classification Search .................. 455/438; 725/87; 370/230

See application file for complete search history.

(56) References Cited

U.S. PATENT DOCUMENTS

| | | | | |
|---|---|---|---|---|
| 6,765,868 | B1 * | 7/2004 | Dunn et al. | 370/230 |
| 7,099,450 | B1 * | 8/2006 | Huber et al. | 379/211.01 |
| 7,103,906 | B1 * | 9/2006 | Katz et al. | 725/87 |
| 7,127,735 | B1 * | 10/2006 | Lee et al. | 725/87 |
| 7,171,206 | B2 | 1/2007 | Wu | |
| 2003/0073432 | A1 * | 4/2003 | Meade, II | 455/420 |
| 2005/0132082 | A1 * | 6/2005 | Lee et al. | 709/231 |
| 2006/0041674 | A1 * | 2/2006 | Reme | 709/231 |
| 2007/0268842 | A1 * | 11/2007 | Wang | 370/257 |
| 2008/0015807 | A1 * | 1/2008 | Hong | 702/116 |
| 2009/0156216 | A1 * | 6/2009 | Liu et al. | 455/438 |
| 2009/0216351 | A1 * | 8/2009 | Van Horck et al. | 700/94 |
| 2009/0274453 | A1 * | 11/2009 | Viswambharan et al. | 386/126 |

FOREIGN PATENT DOCUMENTS

| | | |
|---|---|---|
| CN | 1638525 | 7/2005 |
| TW | 588265 | 5/2004 |
| TW | 241805 | 10/2005 |
| WO | WO 2007/102046 | 9/2007 |

OTHER PUBLICATIONS

Notification of the First Office Action for Application No. 200810109920l, State Intellectual Property Office of P.R.C., mailed Feb. 5, 2010.

* cited by examiner

*Primary Examiner* — Charles Shedrick
(74) *Attorney, Agent, or Firm* — Finnegan, Henderson, Farabow, Garrett & Dunner, LLP

(57) ABSTRACT

A method for resuming data transmission in a data transmission system including multiple information processing units and at least one mobile device, the multiple information processing units and the mobile device each including a wireless communication component, the method includes: transmitting data, by a first one of the multiple information processing units, to the mobile device; recording a transmission status of the mobile device, the transmission status including information regarding an unfinished data transmission by the first information processing unit to the mobile device; and resuming transmitting data relating to the unfinished data transmission, by a second one of the multiple information processing units, to the mobile device based on the recorded transmission status.

34 Claims, 8 Drawing Sheets

100

SYSTEM AND METHOD FOR RESUMABLE DATA TRANSMISSION

FIELD OF THE INVENTION

This invention pertains in general to data transmission systems and, more particularly, to methods and systems for resumable data transmission.

BACKGROUND OF THE INVENTION

Data transmission systems have gained worldwide popularity due to their broad applications in different environments, such as shopping malls or business buildings. Such systems may present a meaningful and efficient solution to transmit data and distribute information (e.g., traffic information, weather information, or advertisements) to a plurality of users who may be interested in the information. Advances in computers, communications, and wireless networks further increase development of these data transmission systems.

For example, a conventional data transmission system may be a broadcasting system. The broadcasting system may include a remote server and multiple broadcasting devices (e.g., panel computers or television set-top boxes) in different locations. Each of the multiple broadcasting devices may have a media device (e.g., a display or a speaker). The remote server stores and manages information to be broadcasted. The multiple broadcasting devices receive the information from the remote server through wired or wireless networks, and then broadcast the information to a plurality of users with their media devices.

FIG. 1 shows a broadcasting system 100 as an example of a conventional data transmission system. The system 100 includes a remote server 102 located in a data center and multiple broadcasting devices 104-1,104-2, . . . , 104-K (K is the total number of the broadcasting devices) in different locations. For example, the broadcasting device 104-1 may be a panel computer in a shopping mall and show new arrivals of products; the broadcasting device 104-2 may be a television set-top box in a grocery store and provide product discount information; the broadcasting device 104-3 may be another panel computer in a business building and display news items, etc. All information on the broadcasting devices 104-1, 104-2, . . . , 104-K is received from the remote server 102 through wired or wireless networks, such as cables, Internet, or a wireless local-area network (WLAN).

Such conventional data transmission systems as the broadcasting system 100 are usually one-way, or push, systems, which pre-select data or information to be transmitted to the broadcasting devices. Users of the conventional data transmission systems may be unable to request specific data from the systems. In addition, for the broadcasting system 100, users who view or hear information from one of the broadcasting devices 104-1, 104-2, . . . , 104-K may still forget the information after they leave that one of the broadcasting devices 104-1, 104-2, . . . , 104-K, since the broadcasting devices 104-1, 104-2, . . . , 104-K may be in fixed positions.

With recent advances in mobile communication technologies (e.g., Bluetooth technology), mobile devices (e.g., cellular phones, Personal Digital Assistants (PDAs), or laptop computers) have begun to play an important role in data transmission systems. Data transmission systems with mobile devices may comprise at least one information processing unit (IPU) (e.g., a ticket vending machine having a wireless communication component) and at least one mobile device. The mobile device may wirelessly receive data from the IPU. For example, the mobile device may wirelessly receive electronic coupons from the ticket vending machine.

Compared to conventional data transmission systems like the broadcasting system 100, data transmission systems with mobile devices may enable users to request specific information from IPUs. However, signal coverage and bandwidth of an IPU are usually limited. For example, a mobile device may wirelessly receive data from an IPU within a range of 10 meter from the IPU. If a user of the mobile device leaves the signal coverage area of the IPU before the mobile device completely receives the data, the mobile device may be unable to receive the remaining data from the IPU.

SUMMARY OF THE INVENTION

In accordance with the invention, there is provided a method for resuming data transmission in a data transmission system including multiple information processing units and at least one mobile device, the multiple information processing units and the mobile device each including a wireless communication component, the method comprising: transmitting data, by a first one of the multiple information processing units, to the mobile device; recording a transmission status of the mobile device, the transmission status including information regarding an unfinished data transmission by the first information processing unit to the mobile device; and resuming transmitting data relating to the unfinished data transmission, by a second one of the multiple information processing units, to the mobile device based on the recorded transmission status.

Also in accordance with the invention, there is provided a method for resuming data transmission in a data transmission system including a server, multiple information processing units, and at least one mobile device, the multiple information processing units and the mobile device each including a wireless communication component, the method comprising: transmitting data, by the server, to the multiple information processing units; transmitting data, by a first one of the multiple information processing units, to the mobile device; recording a transmission status of the mobile device, the transmission status including information regarding an unfinished data transmission by the first information processing unit to the mobile device; and resuming transmitting data relating to the unfinished data transmission, by a second one of the multiple information processing units, to the mobile device based on the recorded transmission status.

Further in accordance with the invention, there is provided a data transmission system, comprising: multiple information processing units; and at least one mobile device configured to wirelessly receive data from the multiple information processing units; wherein a first one of the multiple information processing units is configured to perform a resumable data transmission to the mobile device, such that a second one of the multiple information processing units may resume an unfinished data transmission by the first information processing unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

In exemplary embodiments consistent with the present invention, there is provided a distributed data transmission system including multiple information processing units and at least one mobile device. A first information processing unit may be configured to perform resumable data transmission to the mobile device in the system, such that a second information processing unit in the system may resume an unfinished data transmission by the first information processing unit to the mobile device. The first information processing unit may operate in a push mode or a pull mode. When the first information processing unit works in the push mode, it transmits data to the mobile device without receiving a data request from the mobile device. When the first information processing unit works in the pull mode, it transmits data to the mobile device after receiving a data request from the mobile device.

Also in exemplary embodiments consistent with the present invention, there is provided a centralized data transmission system including a server, multiple information processing units, and at least one mobile device. A first information processing unit may be configured to perform resumable data transmission to the mobile device in the system, such that a second information processing unit in the system may resume an unfinished data transmission by the first information processing unit to the mobile device. The first information processing unit may operate in a push mode or a pull mode. When the first information processing unit works in the push mode, it transmits data to the mobile device without receiving a data request from the mobile device. When the first information processing unit works in the pull mode, it transmits data to the mobile device after receiving a data request from the mobile device.

Figure 1:
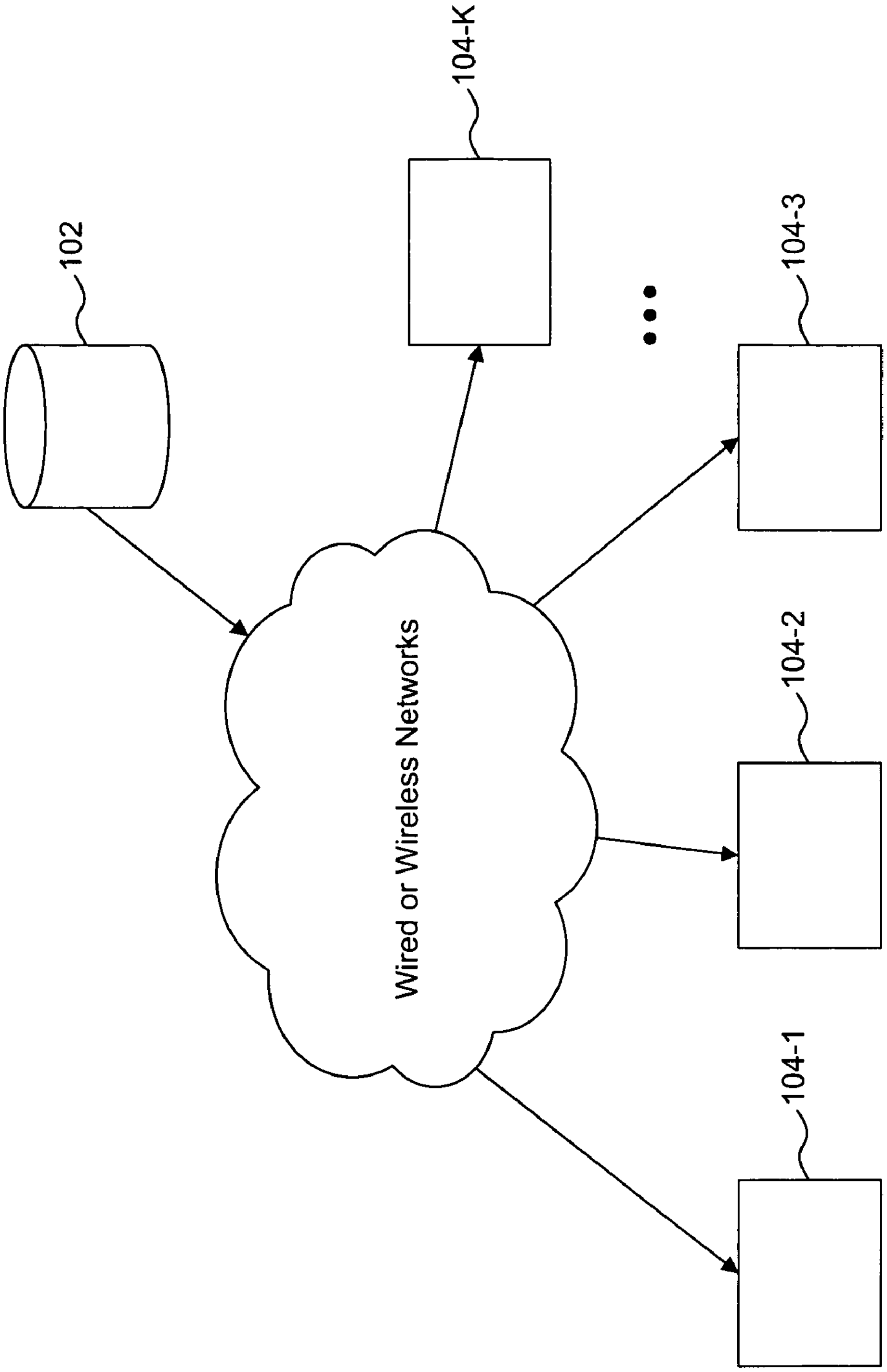
FIG. 1 (Prior Art)
FIG. 1 shows a broadcasting system as an example of a conventional data transmission system.
Figure 2:
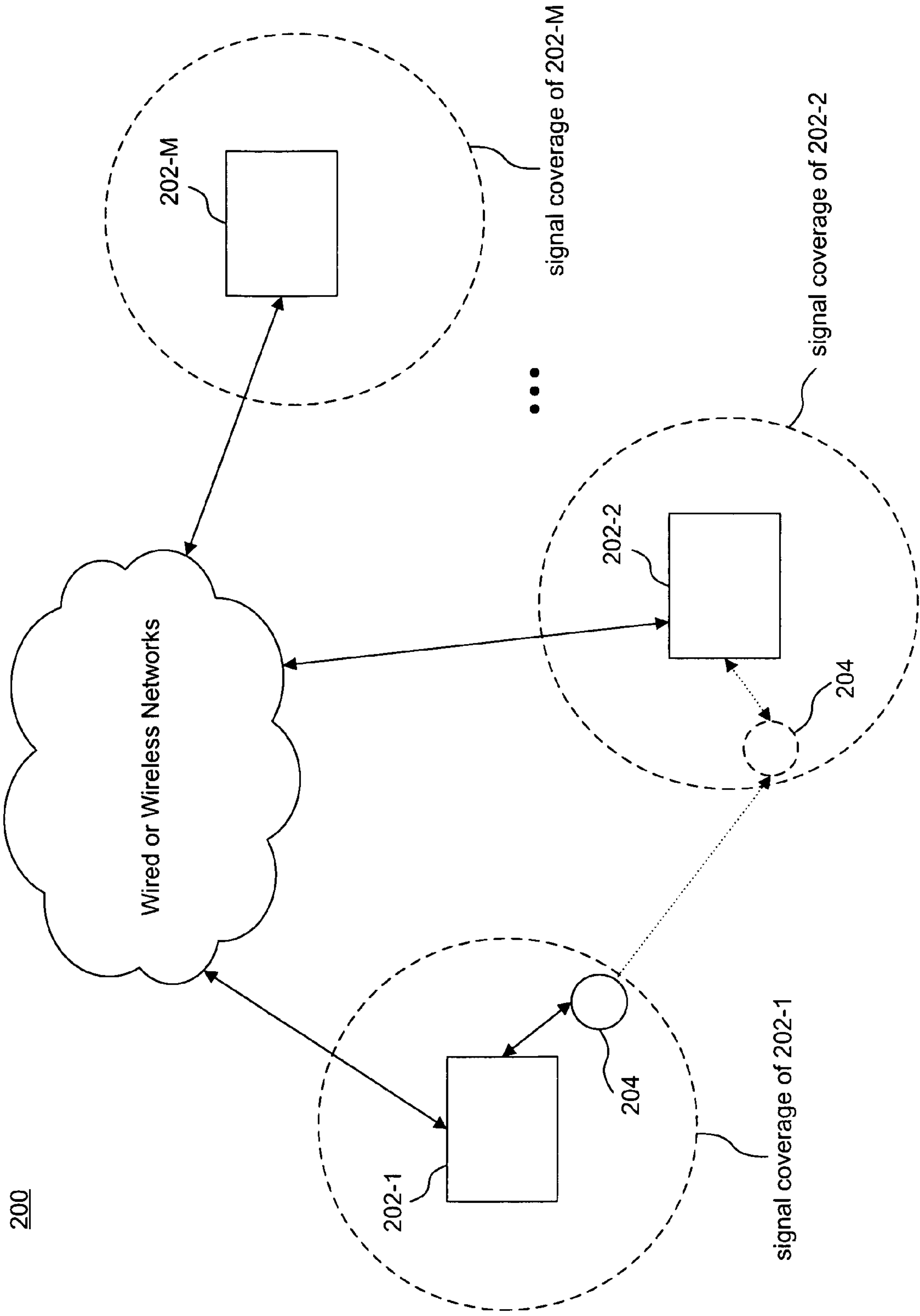
FIG. 2 shows a distributed data transmission system for resumable data transmission, according to an exemplary embodiment.

FIG. 2 illustrates a distributed data transmission system 200 for resumable data transmission, according to an exemplary embodiment. The system 200 includes multiple information processing units (IPUs) 202-1, 202-2, . . . , 202-M (M is the total number of the IPUs) in different locations, and at least one mobile device 204 carried by a user. The mobile device 204 may be a cellular phone, a PDA, a laptop computer, or the like. When the mobile device 204 is in a signal coverage area of one of the IPUs 202-1, 202-2, . . . , 202-M, the mobile device 204 may communicate with that one of the IPUs 202-1, 202-2, . . . , 202-M to receive data.

For example, the multiple IPUs 202-1, 202-2, . . . , 202-M may be in different locations in a shopping mall to provide product discount information to customers. When the mobile device 204 is in the shopping mall and in the signal coverage area of the IPU 202-1, the mobile device 204 may receive the discount information from the IPU 202-1.

The IPUs 202-1, 202-2, . . . , 202-M may include one or more of the following components: a central processing unit (CPU) configured to execute computer program instructions to perform various processes and methods consistent with certain disclosed exemplary embodiments, random access memory (RAM) and read only memory (ROM) configured to access and store information and computer program instructions associated with the disclosed exemplary embodiments, a memory to store data and information, databases to store tables, lists, or other data structures, I/O devices, interfaces, etc. In addition, the IPUs 202-1, 202-2, . . . , 202-M may individually include a multimedia device (e.g., a liquid crystal display or a speaker) to broadcast information or a wireless communication component to transmit data to a mobile device in its signal coverage area, e.g., the mobile device 204. The IPUs 202-1, 202-2, . . . , 202-M may also be individually configured to authenticate a mobile device in its signal coverage area, e.g., the mobile device 204.

A signal coverage area of each of the IPUs 202-1, 202-2, . . . , 202-M is denoted by a dashed line perimeter surrounding the IPU. For convenience of illustration only, each signal coverage area is shown as being circular. However, each signal coverage area may have any configuration determined by the particular construction of the IPU associated therewith.

The IPUs 202-1, 202-2, . . . , 202-M may store data and transmit the data to each other through wired or wireless networks, such as cables, Internet, WLANs, or 3G networks. The transmitted data includes various data files in textual, video, audio, or graphic formats. The IPUs 202-1, 202-2, . . . , 202-M may broadcast contents of their stored data files with their multimedia devices, or store data received from other IPUs in the system 200. The IPUs 202-1, 202-2, . . . , 202-M may also transmit their stored data to a mobile device in their signal coverage areas, e.g., the mobile device 204.

For example, data may be transmitted as data packets from one of the IPUs 202-1, 202-2, . . . , 202-M to the mobile device 204. A data packet transmitted from the one of the IPUs 202-1, 202-2, . . . , 202-M to the mobile device 204 is a formatted block of data and may, as more fully described below, include information regarding a transmission status for resumption (TSR) of the mobile device 204. The packet information includes an ID of a wireless communication component on the one of the IPUs 202-1, 202-2, . . . , 202-M, the number of data files that have not been completely transmitted to the mobile device 204, and breakpoint addresses in the data files. Data beginning from the breakpoint addresses in the data files has not been transmitted to the mobile device 204.

In one exemplary embodiment, any of the IPUs 202-1, 202-2, . . . , 202-M in the system 200 may work in a push mode. For example, when the IPU 202-1 works in the push mode, it first detects a mobile device in its signal coverage area (e.g., the mobile device 204) and then transmits data to the mobile device with its wireless communication component. The transmitted data includes one or more data files in textual, video, audio, or graphic formats.

In one exemplary embodiment, any of the IPUs 202-1, 202-2, . . . , 202-M in the system 200 may work in a pull mode. For example, when the IPU 202-1 works in the pull mode, the IPU 202-1 receives a data request from a mobile device in its signal coverage area, e.g., the mobile device 204. In response, the IPU 202-1 transmits a file list to the mobile device with its wireless communication component. The file list provides titles or a brief description of contents of various data files stored on the IPUs 202-1, 202-2, . . . , 202-M. The various data files may be in textual, video, audio, or graphic formats. Depending on a selection from the file list by a user of the mobile device, the IPU 202-1 further transmits one or more of the selected data files to the mobile device.

In one exemplary embodiment, a polling method is utilized by one of the IPUs 202-1, 202-2, . . . , 202-M in the pull mode when the one of the IPUs 202-1, 202-2, . . . , 202-M serves multiple mobile devices simultaneously. For example, the IPU 202-1 may have fewer communication channels than the number of multiple mobile devices it is serving. The IPU 202-1 may provide data transmission to several of the multiple mobile devices using a like number of its communication channels, i.e., with each communication channel corresponding to one of the several mobile devices. The IPU 202-1 may then use remaining ones of its communication channels to check whether any remaining mobile devices, to which it is not transmitting data, have a data request or to ask the remaining mobile devices to enter a waiting status.

In exemplary embodiments consistent with the present invention, a first IPU may be configured to perform resumable data transmission to a mobile device, e.g., the mobile device 204, in the system 200 such that a second IPU in the system 200 may resume an unfinished data transmission by the first IPU to the mobile device. For example, the mobile device 204 may leave the signal coverage area of the IPU 202-1 before the IPU 202-1 finishes transmitting a data file to the mobile device 204. When the mobile device 204 enters the signal coverage area of the IPU 202-2, the IPU 202-2 may detect the mobile device 204 and that there was an unfinished data transmission from the IPU 202-1 to the mobile device 204. The IPU 202-2 may then resume the unfinished data transmission to the mobile device 204.

Figure 3A:
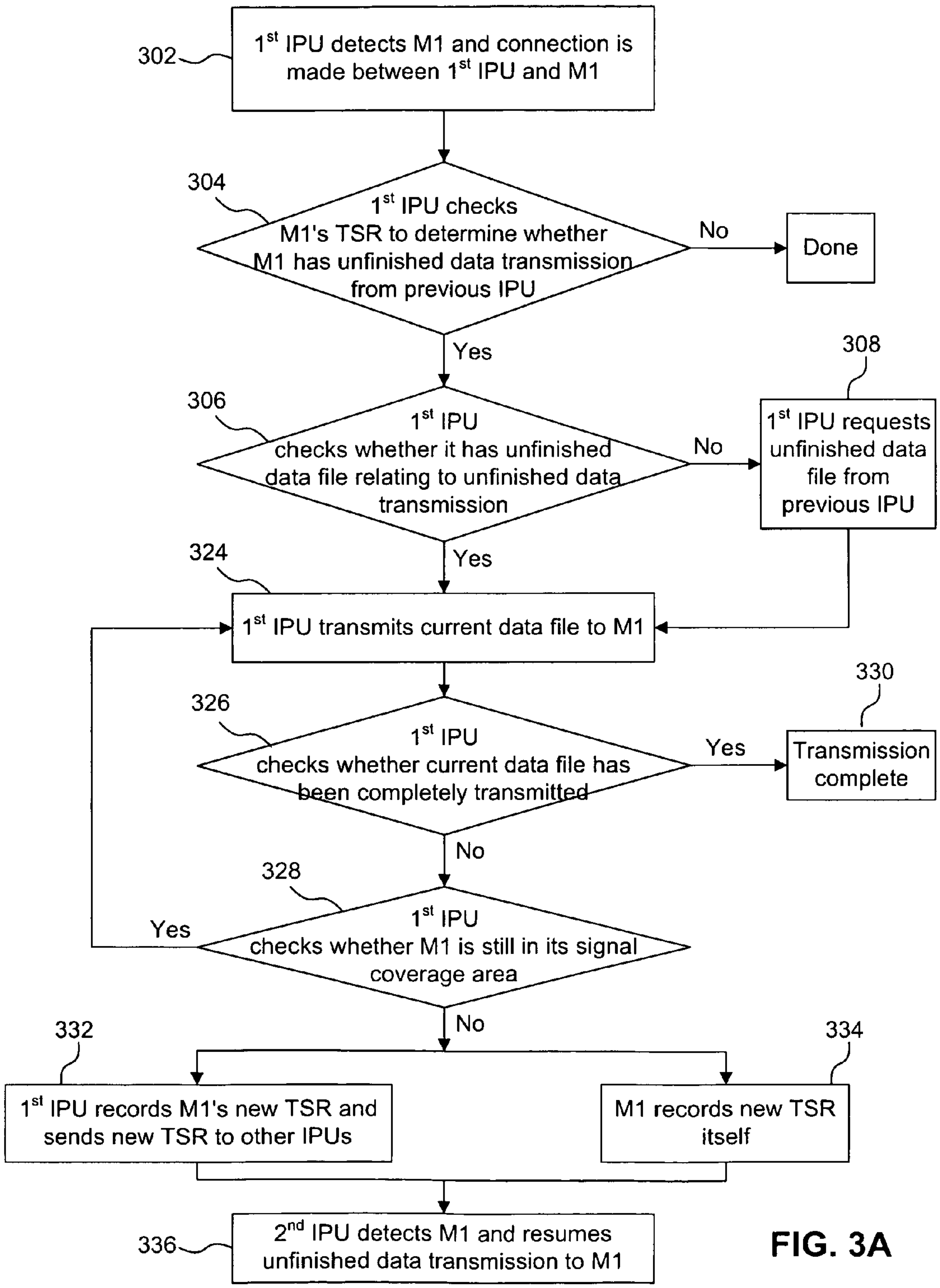
FIG. 3A illustrates a flowchart of a method for an information processing unit in a push mode to perform resumable data transmission in a distributed data transmission system, according to an exemplary embodiment.
Figure 3B:
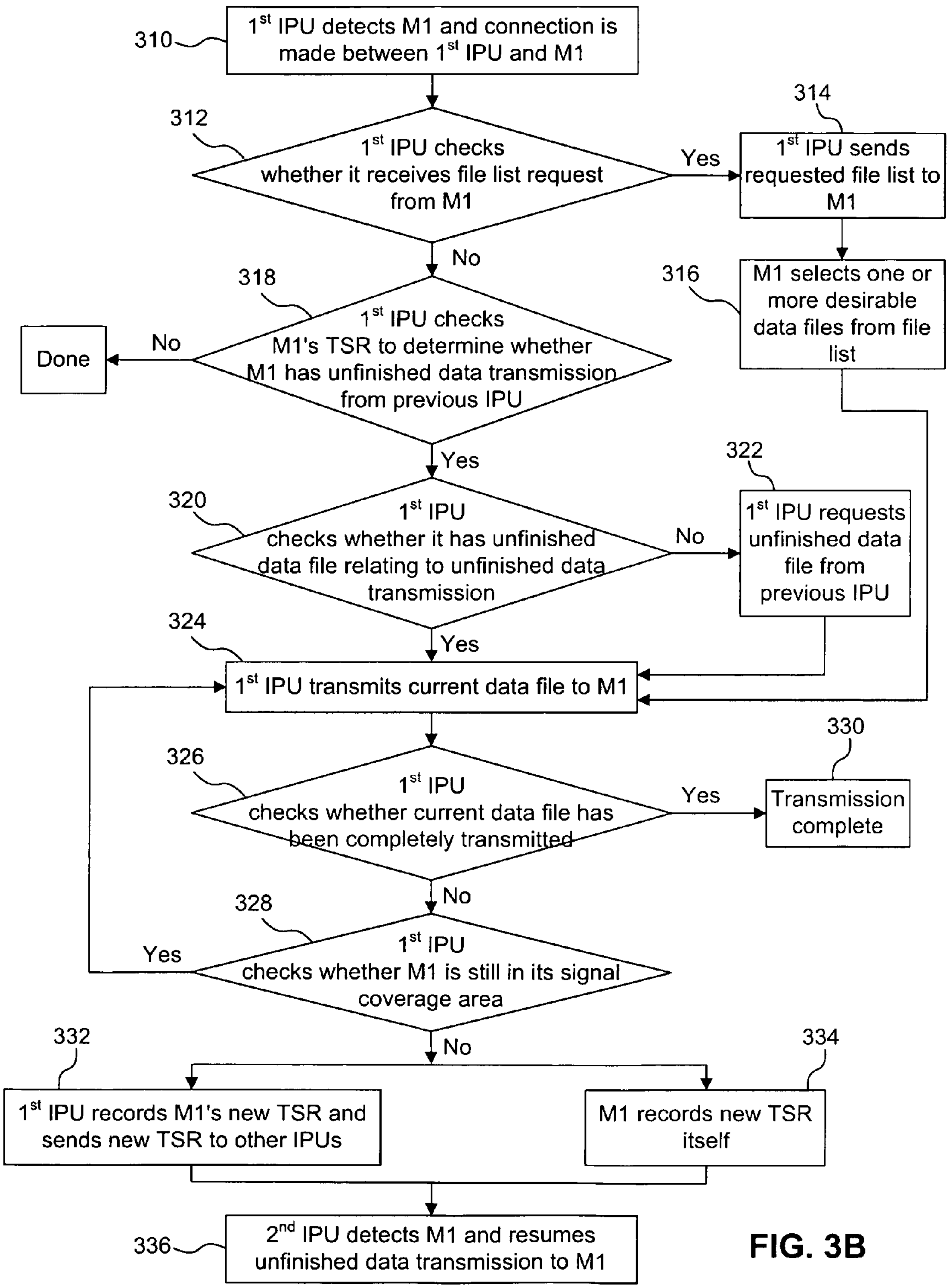
FIG. 3B illustrates a flowchart of a method for an information processing unit in a pull mode to perform resumable data transmission in a distributed data transmission system, according to an exemplary embodiment.

FIGS. 3A and 3B illustrate flowcharts of methods for a first IPU in the push mode and the pull mode, respectively, to perform resumable data transmission to a mobile device M1 in the system 200 (FIG. 2), such that a second IPU in the system 200 (FIG. 2) may resume an unfinished data transmission by the first IPU, according to an exemplary embodiment. The unfinished data transmission includes at least one data file that has not been completely transmitted to the mobile device M1. The first and second IPUs may be any two of the IPUs 202-1, 202-2, . . . , 202-M, and the mobile device M1 may be the mobile device 204 in the system 200 (FIG. 2).

FIG. 3A illustrates a flowchart of the method for the first IPU in the push mode to perform resumable data transmission to the mobile device M1. The first IPU detects the mobile device M1 in its signal coverage area and a connection is made between the first IPU and the mobile device M1 in step 302. The first IPU then checks a transmission status for resumption (TSR) of the mobile device M1 to determine whether the mobile device M1 has an unfinished data transmission from a previous IPU in the system 200 (FIG. 2) in step 304.

In one exemplary embodiment, the first IPU may receive the TSR of the mobile device M1 from the previous IPU before the connection is made between first IPU and the mobile device M1, or from the mobile device M1 after the connection is made.

If the first IPU determines that there is an unfinished data transmission from the previous IPU in the system 200 (FIG. 2) to the mobile device M1, the first IPU checks whether it has an unfinished data file relating to the unfinished data transmission (step 306). If the first IPU determines that it does not have the unfinished data file, the first IPU may request the unfinished data file from the previous IPU in step 308. Whether the first IPU has the unfinished data file in advance or requests the unfinished data file from the previous IPU, the unfinished data file may be a relatively large data file or a segment of the relatively large data file including data that has not been transmitted to the mobile device M1 yet. In one exemplary embodiment, the previous IPU may slice the relatively large data file into multiple segments and transmit one or more segments at a time to another IPU in the system 200 (FIG. 2). For example, the unfinished data file may be a segment of the relatively large data file beginning from a breakpoint address in the relatively large data file, with the breakpoint address being indicated by the TSR of the mobile device M1. The first IPU may then resume transmitting the unfinished data file to the mobile device M1.

FIG. 3B illustrates a flowchart of the method for the first IPU in the pull mode to perform resumable data transmission to the mobile device M1. The first IPU detects the mobile device M1 in its signal coverage area and a connection is made between the first IPU and the mobile device M1 in step 310. The first IPU then checks whether it receives a request for a file list from the mobile device M1 (step 312). For example, the file list may provide titles of various data files stored on the IPUs 202-1, 202-2, . . . , 202-M (FIG. 2) or a brief description of contents of the various data files. The various data files may be in textual, video, audio, or graphic formats.

If the first IPU determines that it receives the request for the file list from the mobile device M1, the first IPU sends the requested file list to the mobile device M1 (step 314). The mobile device M1 then selects one or more desirable data files from the file list (step 316). The first IPU may further send the one or more selected data files to the mobile device M1. In one exemplary embodiment, the one or more selected data files may not be stored on the first IPU. The first IPU may obtain the one or more selected data files from other IPUs having the files and then send the obtained files to the mobile device M1.

If the first IPU determines that it does not receive the request for the file list from the mobile device M1, the first IPU checks a TSR of the mobile device M1 to determine whether the mobile device M1 has an unfinished data transmission from a previous IPU in the system 200 (FIG. 2) (step 318). In one exemplary embodiment, the first IPU may receive the TSR of the mobile device M1 from the previous IPU before the connection is made between first IPU and the mobile device M1, or from the mobile device M1 after the connection is made.

If the first IPU determines that there is an unfinished data transmission from the previous IPU to the mobile device M1, the first IPU checks whether it has an unfinished data file relating to the unfinished data transmission (step 320). If the first IPU determines that it does not have the unfinished data file, the first IPU may request the unfinished data file from the previous IPU in step 322. Whether the first IPU has the unfinished data file in advance or requests the unfinished data file from the previous IPU, the unfinished data file may be a relatively large data file or a segment of the relatively large data file including data that has not been transmitted to the mobile device M1 yet. In one exemplary embodiment, the previous IPU may slice the relatively large data file into multiple segments and transmit one or more segments at a time to an IPU in the system 200 (FIG. 2). For example, the unfinished data file may be a segment of the relatively large data file beginning from a breakpoint address in the relatively large data file, with the breakpoint address being indicated by the TSR of the mobile device M1. The first IPU may then resume transmitting the unfinished data file to the mobile device M1.

Referring to FIGS. 3A and 3B, the first IPU transmits a current data file to the mobile device M1 in step 324. The current data file may be the unfinished data file including data that has not been transmitted by the previous IPU to the mobile device M1, or one of the desirable data files selected from the file list, as noted above. The first IPU then checks whether the current data file has been completely transmitted (step 326). If the current data file has not been completely transmitted, the first IPU further checks whether the mobile device M1 is still in its signal coverage area (step 328). Steps 324, 326, and 328 are repeated as long as the current data file has not been completely transmitted and the mobile device M1 is still in the signal coverage area of the first IPU. If the first IPU determines that the current data file has been completely transmitted before the mobile device M1 leaves its signal coverage area, transmission of the current data file is complete (step 330).

If the first IPU determines that the current data file has not been completely transmitted before the mobile device M1 leaves the first IPU's signal coverage area, which means there is a new unfinished data transmission, the first IPU may record a new TSR of the mobile device M1, including a new breakpoint address in the current data file that has not been completely transmitted, and send the new TSR of the mobile device M1 to other IPUs in the system 200 (FIG. 2) (step 332). Additionally or alternatively, the mobile device M1 may record the new TSR itself (step 334) and send the new TSR to the second IPU when a connection between the mobile device M1 and the second IPU is made.

When the second IPU detects the mobile device M1, the second IPU may resume the new unfinished data transmission to the mobile device M1 (step 336), as described above beginning from step 302.

In exemplary embodiments consistent with the present invention, the first IPU may transmit one or more new unfinished data files relating to the new unfinished transmission to other IPUs in the system 200 (FIG. 2) before the second IPU detects the mobile device M1. For example, if available bandwidth is larger than a prescribed high value, the first IPU may transmit the one or more new unfinished data files to IPUs in the system 200 (FIG. 2) that are close to itself. If the available bandwidth is smaller than a prescribed low value, the first IPU may transmit the one or more new unfinished data files to IPUs preferred by the user of the mobile device M1 in the system 200 (FIG. 2). For example, the preferred IPUs may be in locations where the user often visits. If the available bandwidth is smaller than the prescribed high value but larger than the prescribed low value, the first IPU may transmit the one or more new unfinished data files to one or more specific IPUs in the system 200 (FIG. 2). The one or more specific IPUs may be determined based on algorithms that predict possible paths of the user of the mobile device M1 between the first IPU and the preferred IPUs. In such case, the one or more specific IPUs would be close to the first IPU and on the predicted paths.

Figure 4:
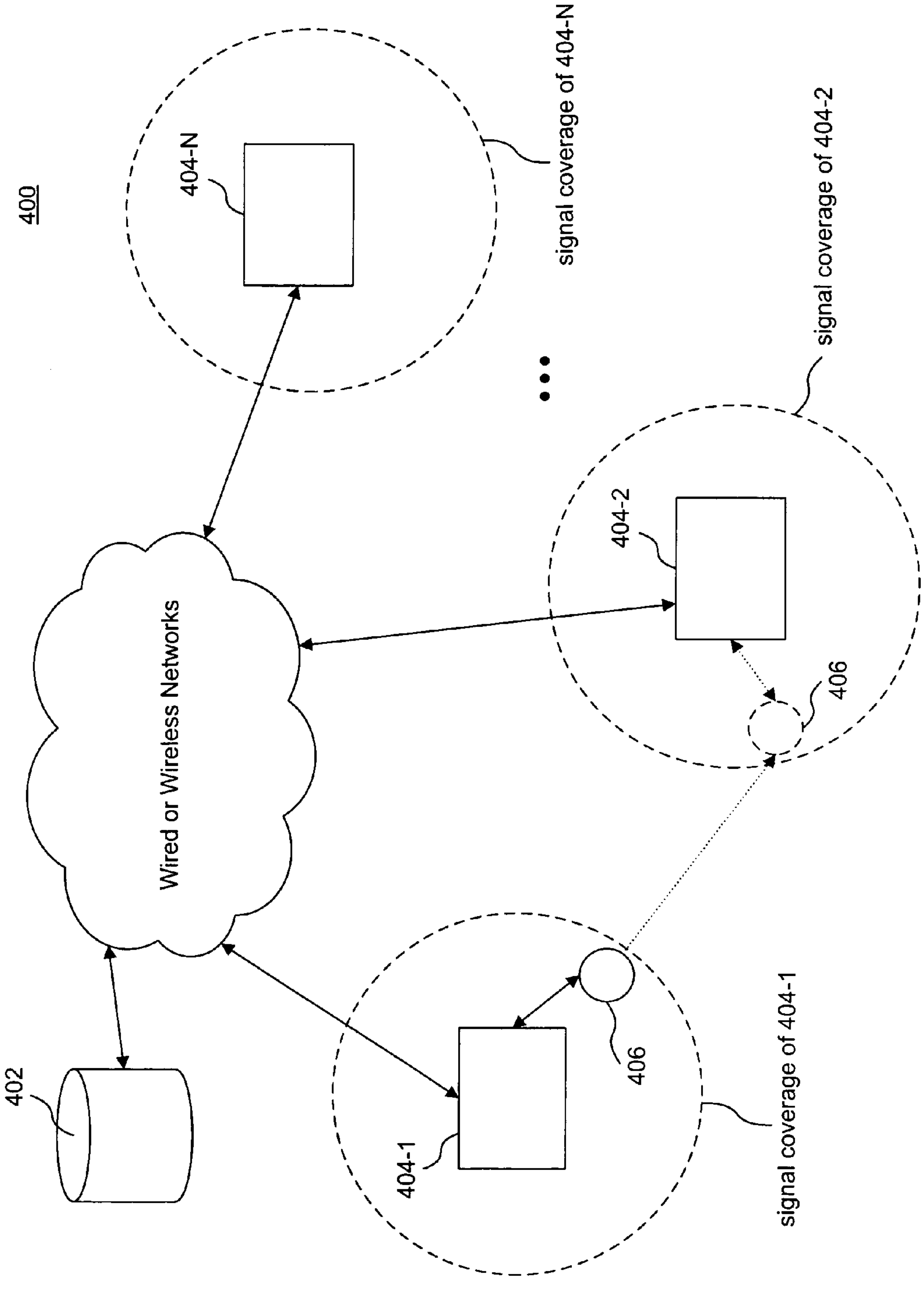
FIG. 4 shows a centralized data transmission system for resumable data transmission, according to an exemplary embodiment.

FIG. 4 illustrates a centralized data transmission system 400 for resumable data transmission, according to an exemplary embodiment. The system 400 includes a remote server 402, multiple information processing units (IPUs) 404-1, 404-2, . . . , 404-N (N is the total number of the IPUs) in different locations, and at least one mobile device 406 carried by a user. The mobile device 406 may be a cellular phone, a PDA, a laptop computer, or the like. When the mobile device 406 is in a signal coverage area of one of the IPUs 404-1, 404-2, . . . , 404-N, the mobile device 406 may communicate with that one of the IPUs 404-1, 404-2, . . . , 404-N to receive data.

For example, the multiple IPUs 404-1, 404-2,. . . , 404-N may be in different locations in a shopping mall to provide product discount information to customers. When the mobile device 406 is in the shopping mall and in the signal coverage area of the IPU 404-1, the mobile device 406 may receive the discount information from the IPU 404-1.

The remote server 402 and the IPUs 404-1, 404-2, . . . , 404-N may include one or more of the following components: a central processing unit (CPU) configured to execute computer program instructions to perform various processes and methods consistent with certain disclosed exemplary embodiments, random access memory (RAM) and read only memory (ROM) configured to access and store information and computer program instructions associated with the disclosed exemplary embodiments, a memory to store data and information, databases to store tables, lists, or other data structures, I/O devices, interfaces, etc. In addition, the IPUs 404-1, 404-2, . . . , 404-N may individually include a multimedia device (e.g., a liquid crystal display or a speaker) to broadcast information or a wireless communication component to transmit data to a mobile device in its signal coverage area (e.g., the mobile device 406). The IPUs 404-1, 404-2, . . . , 404-N may also be individually configured to authenticate a mobile device in its signal coverage area (e.g., the mobile device 406).

A signal coverage area of each of the IPUs 404-1, 404-2, . . . , 404-N is denoted by a dashed line perimeter surrounding the IPU. For convenience of illustration only, each signal coverage area is shown as being circular. However, each signal coverage area may have any configuration determined by the particular construction of the IPU associated therewith.

The remote server 402 stores data to be transmitted and periodically transmits the data to the IPUs 404-1, 404-2, . . . , 404-N through wired or wireless networks, such as cables, Internet, WLANs, or 3G networks. The transmitted data includes various data files in textual, video, audio, or graphic formats. The IPUs 404-1, 404-2, . . . , 404-N may store data received from the remote server 402 in addition to broadcasting contents of the received data files on their multimedia devices. The IPUs 404-1, 404-2, . . . , 404-N may also transmit data received from the remote server 402 to a mobile device in their signal coverage areas, e.g., the mobile device 406.

For example, data may be transmitted as data packets from one of the IPUs 404-1, 404-2, . . . , 404-N to the mobile device 406. A data packet transmitted from the one of the IPUs 404-1, 404-2, . . . , 404-N to the mobile device 406 is a formatted block of data and may, as more fully described below, include information regarding a transmission status for resumption (TSR) of the mobile device 406. The packet information includes an ID of a wireless communication component on the one of the IPUs 404-1, 404-2, . . . , 404-N, the number of data files that have not been completely transmitted to the mobile device 406, and breakpoint addresses in the data files. Data beginning from the breakpoint addresses in the data files has not been transmitted to the mobile device 406.

In one exemplary embodiment, any of the IPUs 404-1, 404-2, . . . , 404-N in the system 400 may work in a push mode. For example, when the IPU 404-1 works in the push mode, it first detects a mobile device (e.g., the mobile device 406) in its signal coverage area and then transmits data to the mobile device with its wireless communication component. The transmitted data includes one or more data files in textual, video, audio, or graphic formats.

In one exemplary embodiment, any of the IPUs 404-1, 404-2, . . . , 404-N in the system 400 may work in a pull mode. For example, when the IPU 404-1 works in the pull mode, the IPU 404-1 receives a data request from a mobile device in its signal coverage area, e.g., the mobile device 406. In response, the IPU 404-1 transmits a file list to the mobile device with its wireless communication component. The file list provides titles or a brief description of contents of various data files stored on the remote server 402 and the IPUs 404-1, 404-2, . . . , 404-N. The various data files may be in textual, video, audio, or graphic formats. Depending on a selection from the file list by a user of the mobile device, the IPU 404-1 further transmits one or more of the selected data files to the mobile device.

In one exemplary embodiment, a polling method is utilized by one of the IPUs 404-1, 404-2, . . . , 404-N in the pull mode when the one of the IPUs 404-1, 404-2, . . . , 404-N serves multiple mobile devices simultaneously. For example, the IPU 404-1 may have fewer communication channels than the number of multiple mobile devices it is serving. The IPU 404-1 may provide data transmission to several of the multiple mobile devices using a like number of its communication channels, i.e., with each communication channel corresponding to one of the several mobile devices. The IPU 404-1 may then use remaining ones of its communication channels to check whether any remaining mobile devices, to which it is not transmitting data, have a data request or to ask the remaining mobile devices to enter a waiting status.

In exemplary embodiments consistent with the present invention, a first IPU may be configured to perform resumable data transmission to a mobile device, e.g., the mobile device 406, in the system 400 such that a second IPU in the system 400 may resume an unfinished data transmission by the first IPU to the mobile device. For example, the mobile device 406 may leave the signal coverage area of the IPU 404-1 before the IPU 404-1 finishes transmitting a data file to the mobile device 406. When the mobile device 406 enters the signal coverage area of the IPU 404-2, the IPU 404-2 may detect the mobile device 406 and that there was an unfinished data transmission from the IPU 404-1 to the mobile device 406. The IPU 404-2 may then resume the unfinished data transmission to the mobile device 406.

Figure 5A:
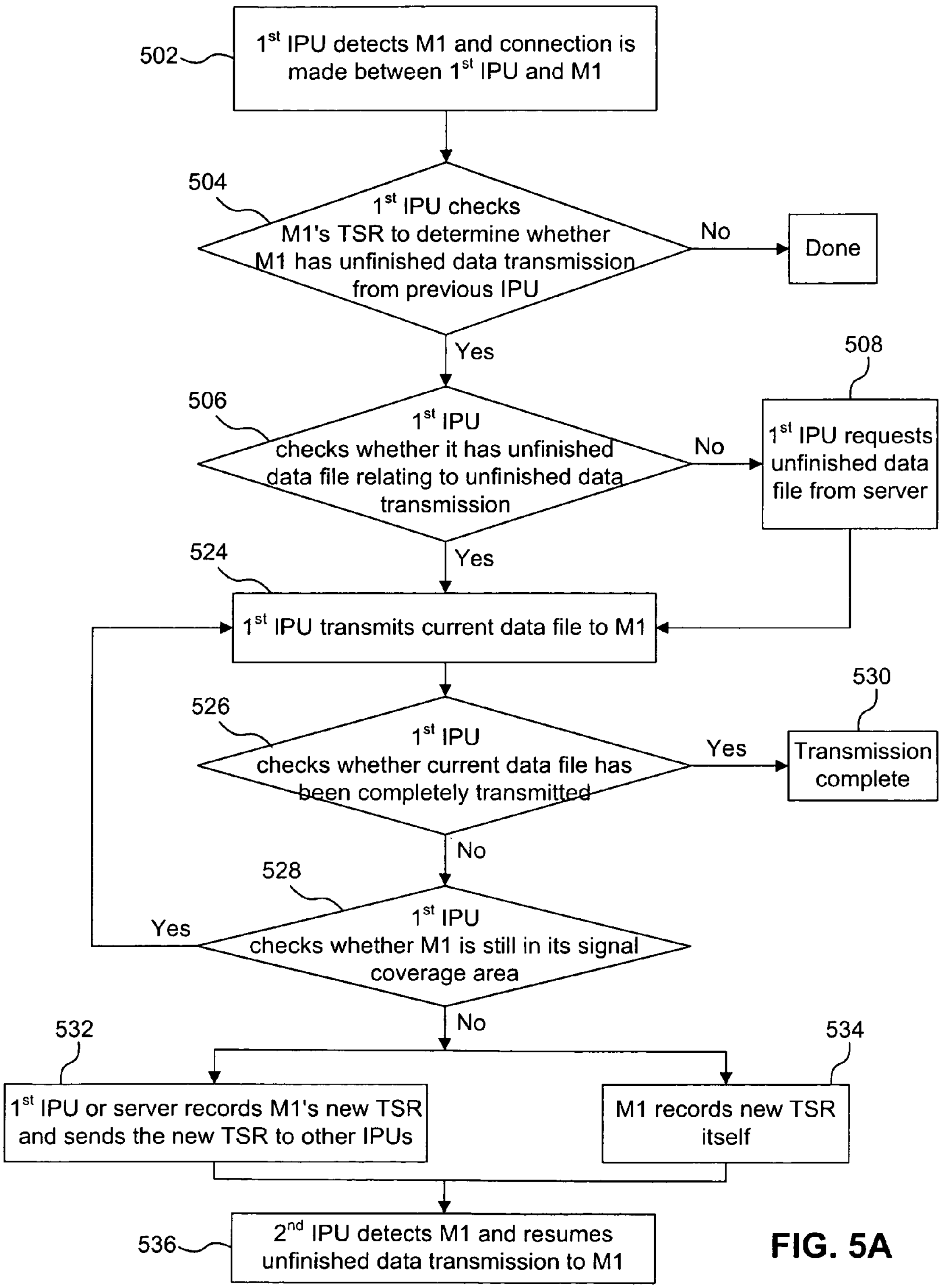
FIG. 5A illustrates a flowchart of a method for an information processing unit in a push mode to perform resumable data transmission in a centralized data transmission system, according to an exemplary embodiment.
Figure 5B:
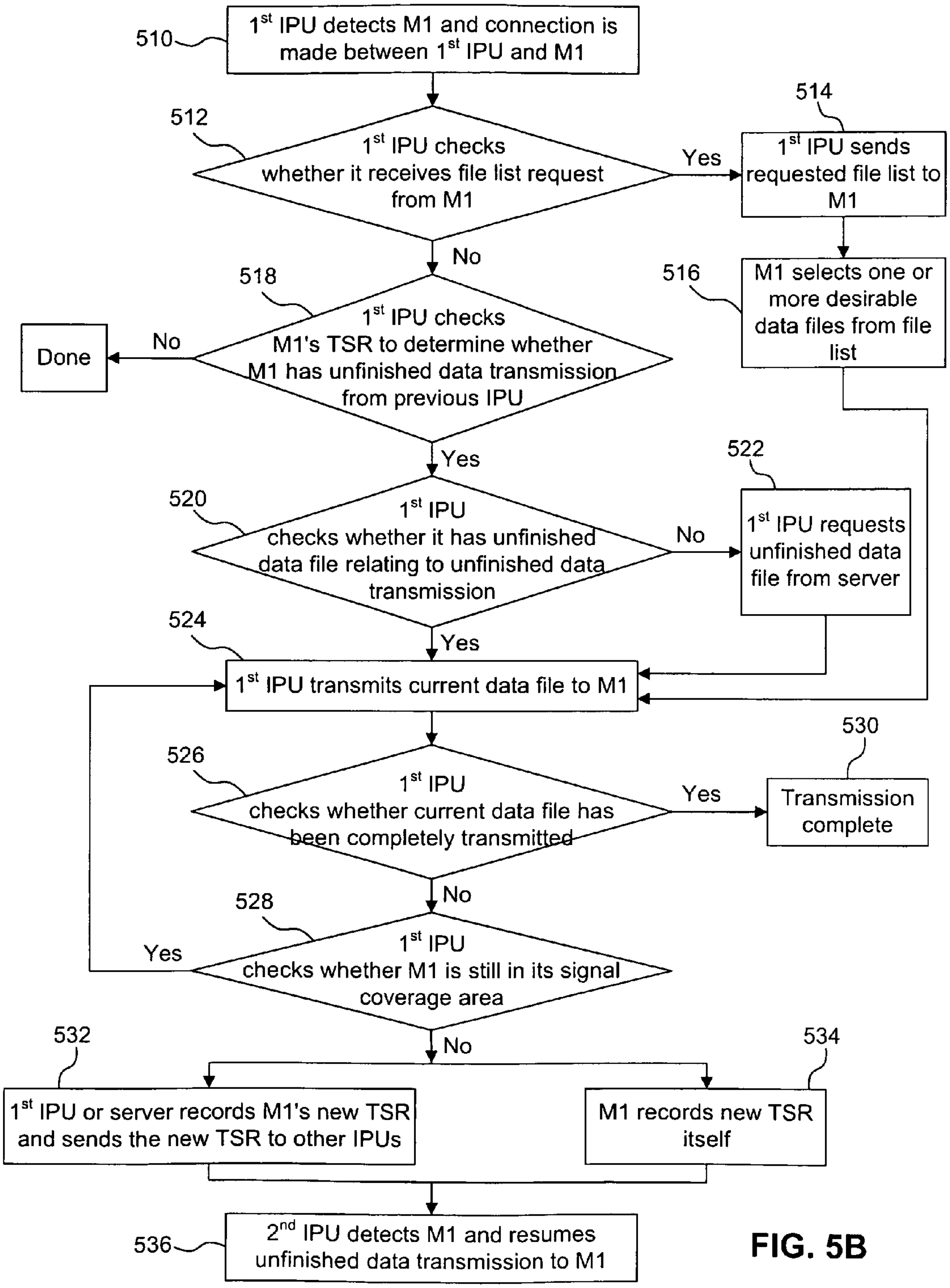
FIG. 5B illustrates a flowchart of a method for an information processing unit in a pull mode to perform resumable data transmission in a centralized data transmission system, according to an exemplary embodiment.

FIGS. 5A and 5B illustrate flowcharts of methods for a first IPU in the push mode and the pull mode, respectively, to perform resumable data transmission to a mobile device M1 in the system 400 (FIG. 4), such that a second IPU in the system 400 (FIG. 4) may resume an unfinished data transmission by the first IPU, according to an exemplary embodiment. The unfinished data transmission includes at least one data file that has not been completely transmitted to the mobile device M1. The first and second IPUs may be any two of the IPUs 404-1, 404-2, . . . , 404-N, and the mobile device M1 may be the mobile device 406 in the system 400 (FIG. 4).

FIG. 5A illustrates a flowchart of the method for the first IPU in the push mode to perform resumable data transmission to the mobile device M1. The first IPU detects the mobile device M1 in its signal coverage area and a connection is made between the first IPU and the mobile device M1 in step 502. The first IPU then checks a transmission status for resumption (TSR) of the mobile device M1 to determine whether the mobile device M1 has an unfinished data transmission from a previous IPU in the system 400 (FIG. 4) in step 504.

In one exemplary embodiment, the first IPU may receive the TSR of the mobile device M1 from one of the server 402 (FIG. 4) and the previous IPU before the connection is made between the first IPU and the mobile device M1, or from the mobile device M1 after the connection is made.

If the first IPU determines that there is an unfinished data transmission by the previous IPU in the system 400 (FIG. 4) to the mobile device M1, the first IPU checks whether it has an unfinished data file relating to the unfinished data transmission (step 506). If the first IPU determines that it does not have the unfinished data file, the first IPU may request the unfinished data file from the server 402 (FIG. 4) in step 508. Whether the first IPU has the unfinished data file in advance or requests the unfinished data file from the server 402 (FIG. 4), the unfinished data file may be a relatively large data file or a segment of the relatively large data file including data that has not been transmitted to the mobile device M1 yet. In one exemplary embodiment, the server 402 (FIG. 4) may slice the relatively large data file into multiple segments and transmit one or more segments at a time to an IPU in the system 400 (FIG. 4). For example, the unfinished data file may be a segment of the relatively large data file beginning from a breakpoint address in the relatively large data file, with the breakpoint address being indicated by the TSR of the mobile device M1. The first IPU may then resume transmitting the unfinished data file to the mobile device M1.

FIG. 5B illustrates a flowchart of the method for the first IPU in the pull mode to perform resumable data transmission to the mobile device M1. The first IPU detects the mobile device M1 in its signal coverage area and a connection is made between the first IPU and the mobile device M1 in step 510. The first IPU then checks whether it receives a request for a file list from the mobile device M1 (step 512). For example, the file list may provide titles of various data files stored on the server 402 and IPUs 404-1, 404-2, . . . , 404-N (FIG. 4), or a brief description of contents of the various data files. The various data files may be in textual, video, audio, or graphic formats.

If the first IPU determines that it receives the request for the file list from the mobile device M1, the first IPU sends the requested file list to the mobile device M1 (step 514). The mobile device M1 then selects one or more desirable data files from the file list (step 516). The first IPU may further send the one or more selected data files to the mobile device M1. In one exemplary embodiment, the one or more selected data files may not be stored on the first IPU. The first IPU may obtain the one or more selected data files from the server 402 (FIG. 4). Alternatively, the server 402 (FIG. 4) may indicate to the first IPU another IPU from which the first IPU may obtain the one or more selected data files. The first IPU may then send the obtained files to the mobile device M1.

If the first IPU determines that it does not receive the request for the file list from the mobile device M1, the first IPU checks a TSR of the mobile device M1 to determine whether the mobile device M1 has an unfinished data transmission from a previous IPU in the system 400 (FIG. 4) (step 518). In one exemplary embodiment, the first IPU may receive the TSR of the mobile device M1 from one of the server 402 (FIG. 4) and the previous IPU before the connection is made between the first IPU and the mobile device M1, or from the mobile device M1 after the connection is made.

If the first IPU determines that there is an unfinished data transmission from the previous IPU to the mobile device M1, the first IPU checks whether it has an unfinished data file relating to the unfinished data transmission (step 520). If the first IPU determines that it does not have the unfinished data file, the first IPU may request the unfinished data file from the server 402 (FIG. 4) in step 522. Whether the first IPU has the unfinished data file in advance or requests the unfinished data file from the server 402 (FIG. 4), the unfinished data file may be a relatively large data file or a segment of the relatively large data file including data that has not been transmitted to the mobile device M1 yet. In one exemplary embodiment, the server 402 (FIG. 4) may slice the relatively large data file into multiple segments and transmit one or more segments at a time to an IPU in the system 400 (FIG. 4). For example, the unfinished data file may be a segment of the relatively large data file beginning from a breakpoint address in the relatively large data file, with the breakpoint address being indicated by the TSR of the mobile device M1. The first IPU may then resume transmitting the unfinished data file to the mobile device M1.

Referring to FIGS. 5A and 5B, the first IPU transmits a current data file to the mobile device M1 in step 524. The current data file may be the unfinished data file including data that has not been transmitted by the previous IPU to the mobile device M1, or one of the desirable data files selected from the file list, as noted above. The first IPU then checks whether the current data file has been completely transmitted (step 526). If the current data file has not been completely transmitted, the first IPU further checks whether the mobile device M1 is still in its signal coverage area (step 528). Steps 524, 526, and 528 are repeated as long as the current data file has not been completely transmitted and the mobile device M1 is still in the signal coverage area of the first IPU. If the first IPU determines that the current data file has been completely transmitted before the mobile device M1 leaves its signal coverage area, transmission of the current data file is complete (step 530).

If the first IPU determines that the current data file has not been completely transmitted before the mobile device M1 leaves the first IPU's signal coverage area, which means there is a new unfinished data transmission, the first IPU or the server 402 (FIG. 4) may record a new TSR of the mobile device M1, including a new breakpoint address in the current data file that has not been completely transmitted, and send the new TSR of the mobile device M1 to other IPUs in the system 400 (FIG. 4) (step 532). In one exemplary embodiment, the first IPU may send the new TSR of the mobile device M1 to the server 402 (FIG. 4), and the server 402 (FIG. 4) may then send the new TSR to other IPUs in the system 400 (FIG. 4). Additionally or alternatively, the mobile device M1 may record the new TSR itself (step 534) and send the new TSR to the second IPU when a connection between the mobile device M1 and the second IPU is made.

When the second IPU detects the mobile device M1, the second IPU may resume the new unfinished data transmission to the mobile device M1 (step 536), as described above beginning from step 502.

In exemplary embodiments consistent with the present invention, the server 402 may transmit one or more new unfinished data files relating to the new unfinished transmission to other IPUs in the system 400 (FIG. 4) before the second IPU detects the mobile device M1. For example, if available bandwidth is larger than a prescribed high value, the server 402 may transmit the one or more new unfinished data files to IPUs in the system 400 (FIG. 4) that are close to the first IPU. If the available bandwidth is smaller than a prescribed low value, the server 402 may transmit the one or more new unfinished data files to IPUs preferred by the user of the mobile device M1 in the system 400 (FIG. 4). For example, the preferred IPUs may be in locations where the user often visits. If the available bandwidth is smaller than the prescribed high value but larger than the prescribed low value, the server 402 may transmit the one or more new unfinished data files to one or more specific IPUs in the system 400 (FIG. 4). The one or more specific IPUs may be determined based on algorithms that predict possible paths of the user of mobile device M1 between the first IPU and the preferred IPUs. In such case, the one or more specific IPUs would be close to the first IPU and on the predicted paths.

Figure 6:
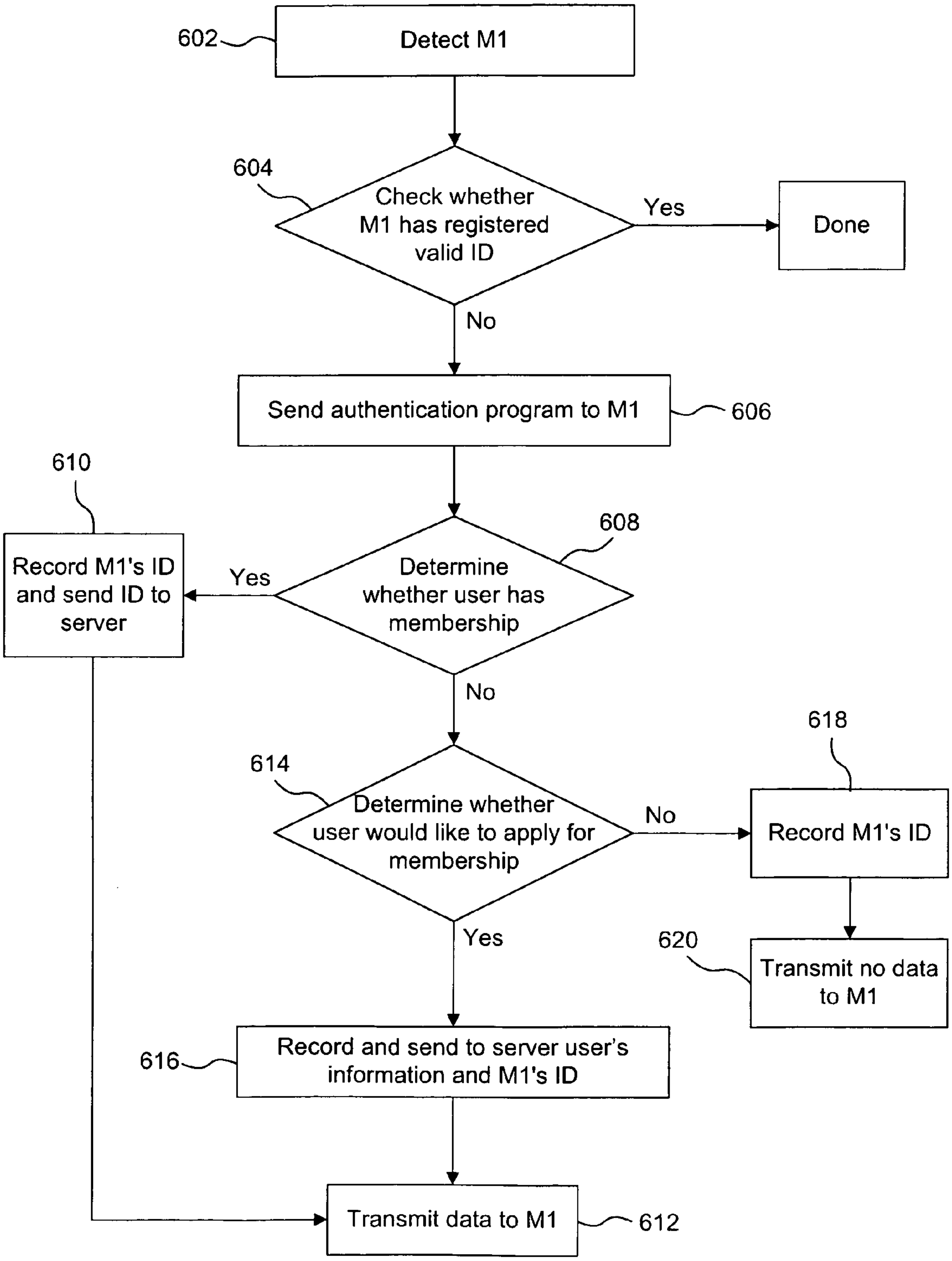
FIG. 6 illustrates a flowchart of a method for an information processing unit to perform authentication of a mobile device in a centralized data transmission system, according to an exemplary embodiment.

FIG. 6 illustrates a method for the first IPU to perform authentication of the mobile device M1 in the system 400 (FIG. 4), according to an exemplary embodiment. After the first IPU detects the mobile device M1 (step 602), the first IPU checks whether the mobile device M1 has registered a valid ID (e.g., a Bluetooth ID) in step 604. If the first IPU determines that the mobile device M1 has registered a valid ID, the authentication is complete. Otherwise, the first IPU sends an authentication program to the mobile device M1 (step 606). The authentication program asks the user of the mobile device M1 whether he/she has membership to, for example, the shopping mall noted above (step 608). If the user has the membership, the first IPU records an ID of the mobile device M1 (e.g., a Bluetooth ID) and sends the ID to the server 402 (FIG. 4) in step 610. The first IPU may then transmit data to the mobile device M1 based on the user's preference (step 612).

If the user does not have the membership, the authentication program asks the user whether he/she would like to apply for the membership (step 614). If the user would like to apply, the first IPU records information about the user (e.g., the user's name or preference) and the ID of the mobile device M1, and sends the information and the ID to the server 402 (FIG. 4) in step 616. The first IPU may then transmit data to the mobile device M1 based on the user's preference as in step 612. If the user would not like to apply for the membership, the first IPU records the ID of the mobile device M1 (step 618), and will not transmit data to the mobile device M1 (step 620).

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for resuming data transmission in a data transmission system including multiple information processing units and at least one mobile device, the multiple information processing units and the mobile device each including a wireless communication component, the method comprising:

transmitting data, by a first one of the multiple information processing units, to the mobile device;

recording a transmission status of the mobile device, the transmission status including information regarding an unfinished data transmission by the first information processing unit to the mobile device, and the recording comprising the first information processing unit sending the transmission status to at least one other information processing unit of the multiple information processing units; and resuming transmitting data relating to the unfinished data transmission, by a second one of the multiple information processing units, to the mobile device based on the recorded transmission status, wherein resuming transmitting the data comprises:

determining whether the mobile device has registered a valid ID;

sending, if it is determined that the mobile device has not registered a valid ID, an authentication program to the mobile device to authenticate the mobile device; and resuming transmitting the data to the mobile device in a push mode or in a pull mode and, if the second one of the multiple information processing units serves more than a predetermined number of mobile devices, further using a polling method to transmit the data to the mobile device;

wherein the first one of the multiple information processing units receives a data file including the data to be transmitted and, if the data file is greater than a predetermined size, slices the data file into multiple segments and transmits at least one of the segments to at least one of the multiple information processing units.

2. The method of claim 1, wherein the transmitting data by the first information processing unit comprises:

detecting the mobile device; and transmitting the data to the mobile device.

3. The method of claim 1, wherein the transmitting data by the first information processing unit comprises:

detecting the mobile device;

receiving a request for data from the mobile device; and transmitting the requested data to the mobile device.

4. The method of claim 1, wherein the transmitting data by the first information processing unit further comprises authenticating the mobile device.

5. The method of claim 4, wherein the first information processing unit checks whether the mobile device has registered a valid ID.

6. The method of claim 1, wherein the recording comprises recording by the first information processing unit of the transmission status.

7. The method of claim 1, wherein the recording comprises recording by the mobile device of the transmission status.

8. The method of claim 1, wherein the recording comprises sending the data relating to the unfinished data transmission to others of the multiple information processing units.

9. The method of claim 8, wherein sending the data comprises predicting ones of the multiple information processing units to which the data relating to the unfinished data transmission is to be sent.

10. The method of claim 1, wherein recording the transmission status comprises recording:

an ID of the wireless communication component of the mobile device;

a number of data files relating to the unfinished data transmission; and breakpoint addresses in the data files;

wherein data after the breakpoint addresses in the data files has not been transmitted to the mobile device.

11. The method of claim 10, wherein the data files are in textual, video, audio, or graphic formats.

12. The method of claim 1, wherein the transmitting of data comprises a push mode and a pull mode by the first information processing unit.

13. The method of claim 1, wherein the first information processing unit reserves at least one channel for polling.

14. A method for resuming data transmission in a data transmission system including a server, multiple information processing units, and at least one mobile device, the multiple information processing units and the mobile device each including a wireless communication component, the method comprising:

transmitting data, by the server, to the multiple information processing units;

transmitting data, by a first one of the multiple information processing units, to the mobile device;

recording a transmission status of the mobile device, the transmission status including information regarding an unfinished data transmission by the first information processing unit to the mobile device, and the recording comprising the first information processing unit sending the transmission status to at least one other information processing unit of the multiple information processing units; and resuming transmitting data relating to the unfinished data transmission, by a second one of the multiple information processing units, to the mobile device based on the recorded transmission status, wherein resuming transmitting the data comprises:

determining whether the mobile device has registered a valid ID;

sending, if it is determined that the mobile device has not registered a valid ID, an authentication program to the mobile device to authenticate the mobile device; and resuming transmitting the data to the mobile device in a push mode or in a pull mode and, if the second one of the multiple information processing units serves more than a predetermined number of mobile devices, further using a polling method to transmit the data to the mobile device;

wherein the first one of the multiple information processing units receives a data file including the data to be transmitted and, if the data file is greater than a predetermined size, slices the data file into multiple segments and transmits at least one of the segments to at least one of the multiple information processing units.

15. The method of claim 14, wherein the first information processing unit checks whether the mobile device has registered a valid ID.

16. The method of claim 14, wherein the transmitting data by the first information processing unit comprises:

detecting the mobile device; and transmitting the data to the mobile device.

17. The method of claim 14, wherein the transmitting data by the first information processing unit comprises:

detecting the mobile device;

receiving a request for data from the mobile device; and transmitting the requested data to the mobile device.

18. The method of claim 14, wherein the transmitting data by the first information processing unit further comprises authenticating the mobile device.

19. The method of claim 14, wherein the recording comprises recording by the server of the transmission status.

20. The method of claim 14, wherein the recording comprises recording by the first information processing unit of the transmission status.

21. The method of claim 14, wherein the recording comprises recording by the mobile device of the transmission status.

22. The method of claim 14, wherein the recording comprises the server sending the transmission status to others of the multiple information processing units.

23. The method of claim 14, wherein the recording comprises the server sending the data relating to the unfinished data transmission to ones of the multiple information processing units.

24. The method of claim 23, wherein sending the data comprises predicting the ones of the multiple information processing units to which the data relating to the unfinished data transmission is to be sent.

25. The method of claim 14, wherein recording the transmission status comprises recording:

an ID of the wireless communication component;

a number of data files corresponding to the unfinished data transmission; and breakpoint addresses in the data files;

wherein data after the breakpoint addresses in the data files has not been transmitted to the mobile device.

26. The method of claim 25, wherein the data files are in textual, video, audio, or graphic formats.

27. The method of claim 14, wherein the transmitting by the first information processing unit comprises a push mode and a pull mode.

28. The method of claim 15, wherein the first information processing unit reserves at least one channel for polling.

29. A data transmission system, comprising:

multiple information processing units; and at least one mobile device configured to wirelessly receive data from the multiple information processing units;

wherein a first one of the multiple information processing units is configured to perform a resumable data transmission to the mobile device, and to send a transmission status of the mobile device to at least one other information processing unit of the multiple information processing units; and a second one of the multiple information processing units is configured to resume an unfinished data transmission by the first information processing unit to the mobile device by:

determining whether the mobile device has registered a valid ID;

sending, if it is determined that the mobile device has not registered a valid ID, an authentication program to the mobile device to authenticate the mobile device; and resuming transmitting the data to the mobile device in a push mode or in a pull mode and, if the second one of the multiple information processing units serves more than a predetermined number of mobile devices, further using a polling method to transmit the data to the mobile device;

wherein the first one of the multiple information processing units receives a data file including data to be transmitted and, if the data file is greater than a predetermined size, slices the data file into multiple segments and transmits at least one of the segments to at least one of the multiple information processing units.

30. The system of claim 29, further comprising a server, the server being configured to store data and transmit the stored data to the multiple information processing units.

31. The system of claim 29, wherein the multiple information processing units are connected with wired or wireless networks.

32. The system of claim 29, wherein one of the multiple information processing units comprises a memory device configured to store data.

33. The system of claim 32, wherein the one of the multiple information processing units further comprises a media device configured to broadcast contents of the stored data.

34. The system of claim 32, wherein the one of the multiple information processing units is configured to authenticate the mobile device.

* * * * *

UNITED STATES PATENT AND TRADEMARK OFFICE

CERTIFICATE OF CORRECTION

PATENT NO. : 8,200,227 B2
APPLICATION NO. : 12/000532
DATED : June 12, 2012
INVENTOR(S) : Chih-Yuan Liu et al.

It is certified that error appears in the above-identified patent and that said Letters Patent is hereby corrected as shown below:

Claim 28, col. 15, line 37, "The method of claim 15" should read --The method of claim 14--.

Signed and Sealed this
Twenty-eighth Day of August, 2012

David J. Kappos
*Director of the United States Patent and Trademark Office*